United States Patent
Ogasawara

(10) Patent No.: US 8,095,705 B2
(45) Date of Patent: Jan. 10, 2012

(54) WIRELESS COMMUNICATING APPARATUS AND CONTROL METHOD OF THE SAME

(75) Inventor: Yasufumi Ogasawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 11/446,118

(22) Filed: Jun. 5, 2006

(65) Prior Publication Data

US 2006/0282557 A1 Dec. 14, 2006

(30) Foreign Application Priority Data

Jun. 9, 2005 (JP) ................................. 2005-168955

(51) Int. Cl.
*G06F 3/00* (2006.01)
*G06F 5/00* (2006.01)

(52) U.S. Cl. .............................................. 710/38
(58) Field of Classification Search ............... 710/38
See application file for complete search history.

(56) References Cited

U.S. PATENT DOCUMENTS

| | | | | |
|---|---|---|---|---|
| 5,890,015 | A * | 3/1999 | Garney et al. | 710/62 |
| 6,603,744 | B2 * | 8/2003 | Mizutani et al. | 370/310 |
| 6,941,114 | B1 * | 9/2005 | Kuo et al. | 455/74 |
| 7,167,975 | B2 * | 1/2007 | Hamdi et al. | 713/1 |
| 7,177,959 | B2 * | 2/2007 | Fukunaga | 710/18 |
| 7,200,685 | B2 * | 4/2007 | Uemura | 710/2 |
| 7,305,511 | B2 * | 12/2007 | Barrett et al. | 710/316 |
| 7,334,072 | B1 * | 2/2008 | Wright | 710/315 |
| 2002/0091724 | A1 * | 7/2002 | Yokoe | 707/500 |
| 2003/0189644 | A1 | 10/2003 | Kikugawa | |
| 2003/0197890 | A1 | 10/2003 | Satake et al. | |
| 2005/0198257 | A1 * | 9/2005 | Gupta et al. | 709/224 |
| 2006/0020723 | A1 * | 1/2006 | Chia-Chun | 710/62 |
| 2006/0059293 | A1 * | 3/2006 | Wurzburg et al. | 710/313 |
| 2006/0132827 | A1 * | 6/2006 | Schanding | 358/1.15 |

FOREIGN PATENT DOCUMENTS

| | | |
|---|---|---|
| JP | 3092152 U | 12/2002 |
| JP | 2003-110452 | 4/2003 |
| JP | 2003-280778 A | 10/2003 |
| JP | 2003-316712 A | 11/2003 |
| JP | 2005-103992 A | 4/2005 |

* cited by examiner

*Primary Examiner* — Chun-Kuan Lee

(74) *Attorney, Agent, or Firm* — Fitzpatrick, Cella, Harper & Scinto

(57) ABSTRACT

A wireless communicating function is provided for a printer, a digital camera, a computer, or another external apparatus can be connected without needing an operation, such as a connection exchange of a device or the like, and the burden on the power supply on the printer can be lightened. A wireless communicating apparatus has a first universal serial bus I/F for connecting to the printer, a communication control unit for allowing the printer to make wireless communication with another external wireless apparatus, and a second universal serial bus I/F for connecting an external universal serial bus apparatus. Either the communication control unit or the second universal serial bus I/F is connected to the first universal serial bus I/F in accordance with a connecting state of the external universal serial bus apparatus to the second universal serial bus I/F.

7 Claims, 4 Drawing Sheets

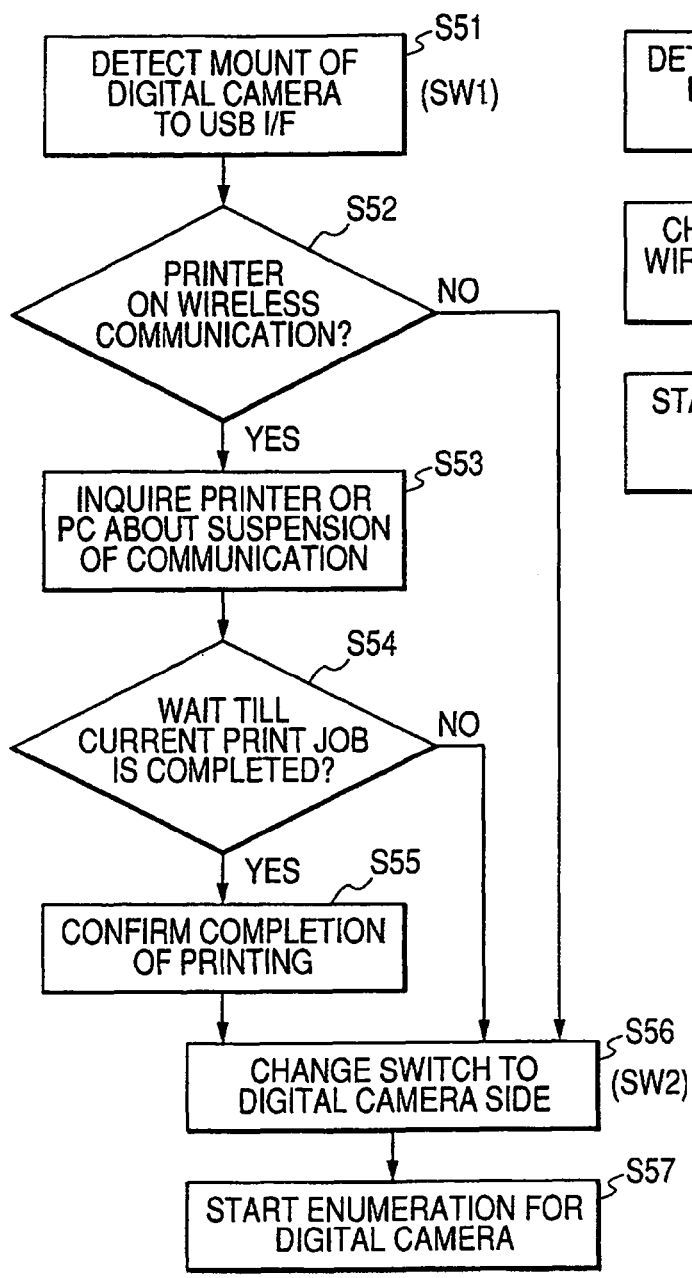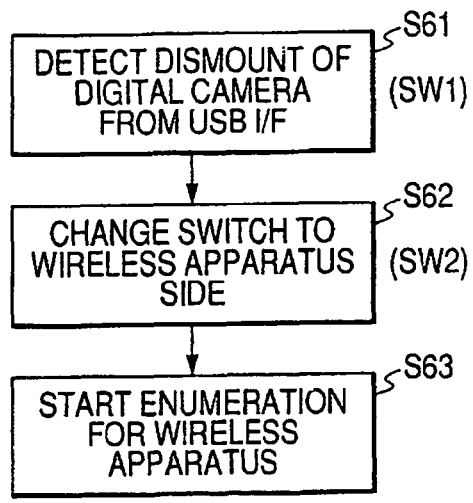

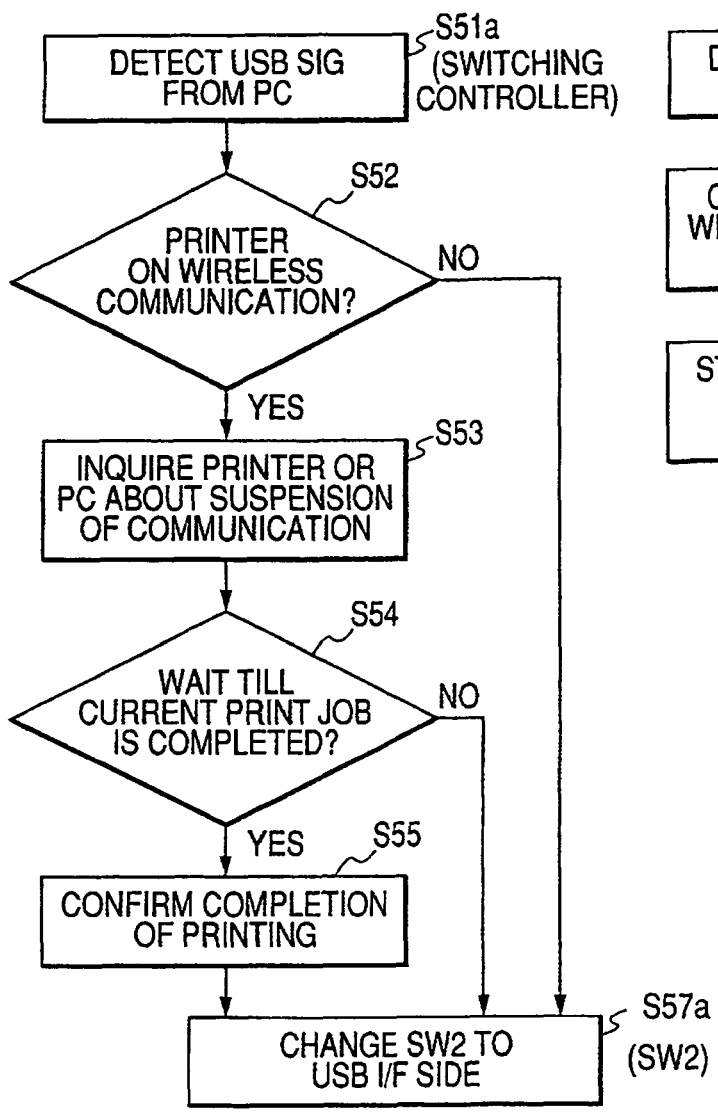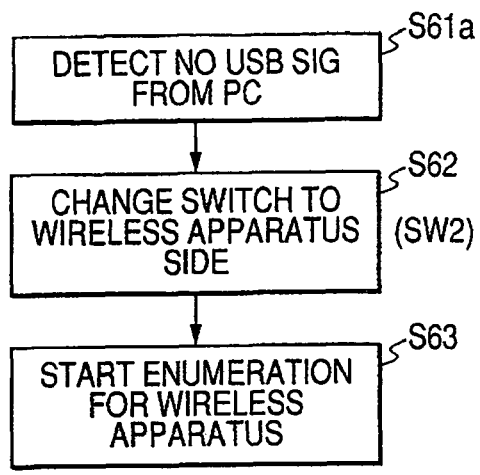
FIG. 6A
FIG. 6B

WIRELESS COMMUNICATING APPARATUS AND CONTROL METHOD OF THE SAME

BACKGROUND OF THE INVENTION

1. Field of the Invention

The invention relates to a wireless communicating apparatus which is connected to a printer and a control method of the wireless communicating apparatus.

2. Related Background Art

A printer is connected as a peripheral apparatus to a host apparatus, such as a computer or the like, through an interface such as a universal serial bus (USB), IEEE1284, or a recommended standard 232 (RS232C) and used to print characters and image data stored in the host apparatus onto a medium such as paper or the like. In recent years, the number of printer products which can execute what is called "direct printing", in which a digital camera is directly connected to the printer and a photograph is printed, has been increasing.

In association with this trend in printer products, the necessity that the printer product has both of a port for connecting to the computer and a port for connecting to the digital camera is increasing.

In the connection between the printer and the digital camera, the industry standard from the Camera & Imaging Products Association (the PictBridge standard) based on the a universal serial bus (USB) standard has been most widespread.

Upon transmission and reception of print data between the printer and the computer, both of the foregoing parallel/serial ports, such as ports complying with the Institute of Electrical and Electronics Engineers standard 1284 (IEEE1284) and ports complying with a recommended standard 232 (RS232C) are used in the wired communication. However, the number of apparatuses using the a universal serial bus (USB) standard is increasing at present.

In association with the spread of the standards such as wireless local area network (LAN), Bluetooth, Infrared Data Association (IrDA), and the like, an environment in which the transmission and reception of data are executed between the computer and a computer peripheral apparatus, between the computers, or between the peripheral apparatuses through the wireless communication according to each standard has rapidly been spread. A type of printer having the wireless communicating interface has also been put into practical use.

To perform wireless communication, it is naturally necessary that the apparatuses for communicating have wireless communicating apparatuses which conform with the same standard. When the apparatus does not have a wireless communicating apparatus therein, it is possible to cope with such a situation by externally attaching a wireless communicating apparatus to the apparatus (for example, refer to Japanese Patent Application Laid-open 2003-110452). In the situation that there are a number of wireless communication standards and the wireless communication standard changes flexibly, a large advantage is obtained by using the externally-attached wireless communicating apparatus.

However, in the case where the externally attached wireless communicating apparatus is connected to the printer through the universal serial bus (USB) port or the like and used, there is such a problem that since an external connecting port is occupied, in the case of using another universal serial bus (USB) apparatus such as a digital camera or the like, a communicating device has to be removed every time.

Although this problem can be solved by a method of providing additional ports for the printer, this solution leads to the problem of an increase in geometrical restrictions on the apparatus design. Although a port, such as a a universal serial bus (USB), can supply electric power to the connected device, if the apparatus is designed so as to supply electric power to all of the ports, there is naturally such a problem that it is necessary to take a countermeasure for enhancing a power source unit, or the like.

According to the universal serial bus standard (USB), although substantially the same effect as that obtained when the number of ports is increased by using a universal serial bus (USB) hub is derived, also in this case, it is necessary to supply more power due to the increase in number of ports. Thus, restrictions on the electrical design of the apparatus increase because of the necessity of the enhancement of the power source unit.

However, generally, since the number of printing operations which can be simultaneously executed by the printer is equal to 1, it is unnecessary for the printer to simultaneously communicate with two or more kinds of apparatuses. The invention intends to propose a solution to the above-noted problems by paying an attention to such a point.

SUMMARY OF THE INVENTION

That is, it is an object of the invention to solve the above problems, and to provide a wireless communicating function for a printer, to enable a digital camera, a computer, or another external apparatus to be connected thereto without needing a operation, such as connection exchange or the like of a device, and to enable the burden of a power supply on the printer to be reduced.

BRIEF DESCRIPTION OF THE DRAWINGS

FIGS. 3A and 3B are flowcharts showing a control procedure of the switching unit in the wireless communicating apparatus of FIG. 1;

FIGS. 6A and 6B are flowcharts showing a control procedure of the switching unit in the wireless communicating apparatus of FIG. 4.

DETAILED DESCRIPTION OF THE PREFERRED EMBODIMENTS

An embodiment of the invention will be described hereinbelow with reference to the drawings.

First Embodiment

Figure 1:
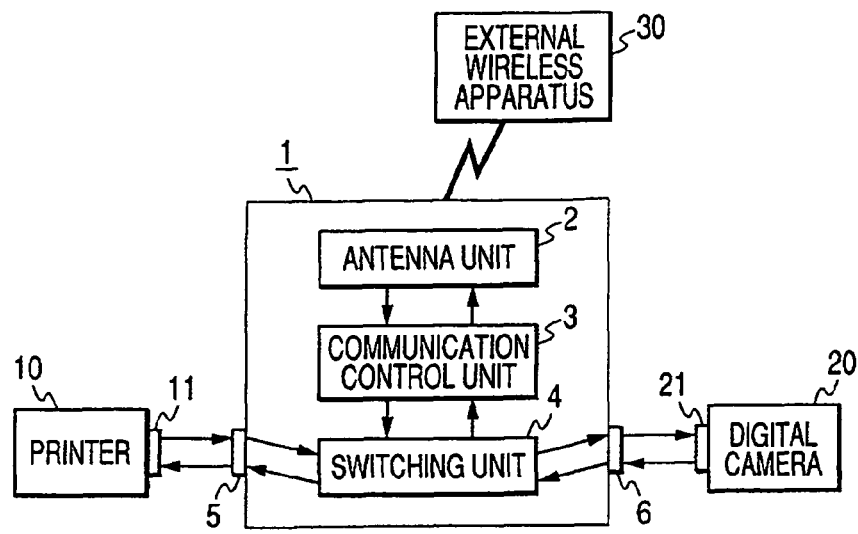
FIG. 1 is a block diagram showing an environment where a wireless communicating apparatus according to the invention is used (first embodiment)

FIG. 1 shows: a wireless communicating apparatus 1 to which the invention is applied; a printer 10 to which the wireless communicating apparatus 1 is connected; a digital camera 20 as an example of other a universal serial bus (USB) apparatuses which are connected to the printer 10; and an external wireless apparatus 30 which communicates with the printer 10 through the wireless communicating apparatus 1.

The wireless communicating apparatus 1 in FIG. 1 has: a a universal serial bus (USB) interface (USB I/F) 5 adapted to connect to the printer; and a universal serial bus (USB) interface (USB I/F) 6 to which another universal serial bus (USB) apparatus is connected. The wireless communicating apparatus 1 has therein an antenna unit 2, a communication control unit 3, and a switching unit 4.

The printer 10 has a universal serial bus (USB) interface (USB I/F) 11 through which the printer 10 can be connected to the universal serial bus (USB) I/F 5 of the wireless communicating apparatus 1. A universal serial bus (USB) connector 21 of the digital camera 20 can be connected to the universal serial bus (USB) I/F 6 of the wireless communicating apparatus 1.

The wireless communicating apparatus 1 has the universal serial bus (USB) I/F 6 on the device side. The digital camera 20 can be connected to the printer 10 by the wireless communicating apparatus 1 through the universal serial bus (USB) I/F 6 in the state where the communication control unit 3 is connected to the printer 10.

In FIG. 1, when the digital camera 20 is not connected, the printer 10 can make wireless communication with the external wireless apparatus 30 through the wireless communicating apparatus 1.

Data transmitted from the external wireless apparatus 30 is received by the antenna unit 2 and sent to the communication control unit 3. The communication control unit 3 converts the received data into a form which can be used by the printer in accordance with a predetermined wireless communication standard such as a standard of Bluetooth or wireless local area network (LAN) and transmits the converted data to the printer 10 through the switching unit 4.

Similarly, the data which is transmitted from the printer 10 to the external wireless apparatus 30 is converted into wireless communication data (data such as radio frequency signal, infrared signal, or the like which conforms with the standard of the wireless communication) by the communication control unit 3 and transmitted from the antenna unit 2.

Figure 2:
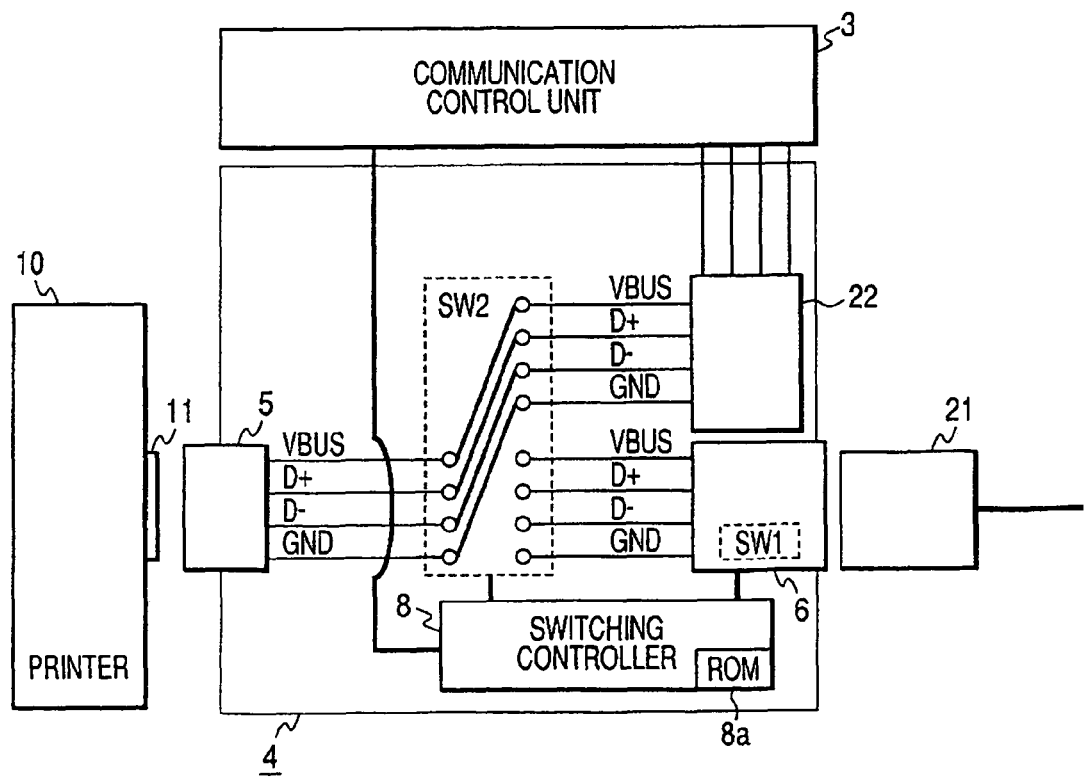
FIG. 2 is a block diagram showing a construction of a switching unit in the wireless communicating apparatus of FIG. 1.

The switching unit 4 includes a switching circuit and a switching controller 8 as shown in FIG. 2. In FIG. 2, SW1 in the universal serial bus (USB) I/F 6 denotes a switch to detect the connection of the universal serial bus (USB) connector of the digital camera.

SW2 in the switching unit 4 denotes a switch to switch a connecting destination of the universal serial bus (USB) I/F 5 of the printer side to either the universal serial bus (USB) I/F 6 or a universal serial bus (USB) interface (USB I/F) 22 of the communication control unit 3 side. Each of the universal serial bus (USB) interfaces 5, 6, and 22 has signal lines of power lines D+ and D−, a bus (VBUS) for transmission and reception of the data, and a ground line GND in accordance with the standard.

The switching controller 8 monitors a connecting state of the digital camera through the switch SW1, monitors a wireless communicating state of the communication control unit 3, and controls the switching operation of the switch SW2 in accordance with a control procedure stored in a read-only memory (ROM) 8a. The switching controller 8 can be constructed by a control circuit, such as a microprocessor or the like.

FIGS. 3A and 3B show a flow of the switching control program stored in the read-only memory (ROM) 8a of the switching controller 8. The operation in the above construction will now be described hereinbelow with reference to FIGS. 3A and 3B.

FIG. 3A shows the control of the switching controller 8 when the digital camera 20 has been connected to the universal serial bus (USB) I/F 6. FIG. 3B shows the control of the switching controller 8 when the digital camera 20 has been dismounted from the universal serial bus (USB) I/F 6. First, the control when the digital camera 20 has been connected will be described and, subsequently, the control when the digital camera 20 is dismounted will be described.

When the connector 21 of the digital camera 20 is mounted to the universal serial bus (USB) I/F 6 of the wireless communicating apparatus 1 connected to the printer 10, this connecting state is detected by the switch SW1 and the switching controller 8 is notified of the detection (step S51). The switching controller 8 confirms the state of the communication control unit 3 and discriminates whether or not the printer 10 is at present performing the wireless communication through the communication control unit 3 (step S52).

If the printer 10 is not performing the wireless communication, the switching controller 8 switches the switch SW2 to the universal serial bus (USB) I/F 6 side (step S56). By this switching operation, the digital camera 20 and the printer 10 are USB-connected and enumeration (searching to recognizing processes of the universal serial bus (USB) device) is started.

If the printer 10 is performing the wireless communication through the communication control unit 3, the switching controller 8 inquires of the user about whether or not the communication which is being made may be stopped (step S53). For example, the switching controller 8 notifies the printer 10 (or a computer (not shown) connected to the printer 10 through the communication control unit 3 or the like) that the connector 21 of the digital camera 20 has been mounted and the printer 10 notifies the user of such a fact by using a display apparatus, such as liquid crystal display (LCD) screen, LED, or the like to the user. In the case of notifying the computer of such a fact, the user is similarly notified by a message window or the like under control of a universal serial bus (USB) driver software or the like of the computer side.

In response to such a notification, the user discriminates whether he waits until a current print job is completed or he cancels the current print job during printing. The user inputs a discrimination result by a switch of the printer or a user interface of the computer. The inputted discrimination result is sent to the switching controller 8 and the switching controller 8 discriminates user input data showing whether he waits until the current print job is completed or he cancels the current print job during printing (step S54).

If the user input designates that the current print job is cancelled during printing, the switching controller 8 immediately switches the switch SW2 to the universal serial bus (USB) I/F 6 side (step S56). By this switching operation, the digital camera 20 and the printer 10 are USB-connected and the enumeration is started.

If the user input designates that the user waits until the current print job is completed, the switching controller 8 continuously monitors the state of the communication control unit 3 and waits until the communication is completed (step S55). After the communication is completed, the switching controller 8 immediately switches the switch SW2 to the universal serial bus (USB) I/F 6 side (step S56). By this switching operation, the digital camera 20 and the printer 10 are USB-connected and the enumeration is started (step S57).

When the connector 21 of the digital camera 20 is dismounted from the universal serial bus (USB) I/F 6 (step S61), the switch SW1 detects the dismount of the connector and notifies the switching controller 8 of it. The switching controller 8 immediately switches the switch SW2 to the universal serial bus (USB) I/F 22 of the communication control unit 3 side (step S62). By this switching operation, the communication control unit 3 and the printer 10 are USB-connected and the enumeration is started (step S63).

According to the embodiment, even if the printer 10 has only one universal serial bus (USB) interface, the universal serial bus (USB) I/F of the communication control unit 3 or the digital camera 20 can be connected to the universal serial bus (USB) I/F 5 of the printer 10 side under the control of the switching unit 4 (switching controller 8). In this case, since the control is made by the switching unit (switching controller 8) so that either the communication control unit 3 or the digital camera 20 (it is not limited to the digital camera but another arbitrary universal serial bus (USB) apparatus may be used) is connected to the universal serial bus (USB) I/F 5 of the printer 10 side, if the switching unit 4 which always operates is excluded, in terms of the electric power that is supplied from the printer 10 through the universal serial bus (USB) I/F 11, it is sufficient to supply the electric power for one apparatus (one universal serial bus (USB) device).

Therefore, since it is sufficient that a power source unit of the printer 10 has the ability to supply electric power to almost one universal serial bus (USB) device from the universal serial bus (USB) I/F 11, no influence is exerted on the designing conditions of the printer 10 and the manufacturing costs of the printer 10 are not increased.

The switching control of the switching unit 4 (switching controller 8) is made while monitoring the connecting state of the digital camera 20 (or another universal serial bus (USB) apparatus) and the communicating state of the communication control unit 3. When the digital camera 20 (or another universal serial bus (USB) apparatus) is connected, if the communication control unit 3 side is communicating, the user is required to confirm whether or not he stops the communication which is being executed by the printer 10. Therefore, such a problem that the important printing is stopped against the intention of the user does not occur.

Second Embodiment

The explanation has been made above with respect to the construction in which the universal serial bus (USB) I/F of either the communication control unit 3 or the external universal serial bus (USB) apparatus (digital camera 20) is connected to the universal serial bus (USB) I/F of the printer 10 by the wireless communicating apparatus 1 connected to the printer 10. A construction in which the wireless communicating apparatus 1 having substantially the same construction as that shown in FIG. 1 is connected between the printer 10 and a computer 40 and used as shown in FIG. 4 is also considered.

Figure 4:
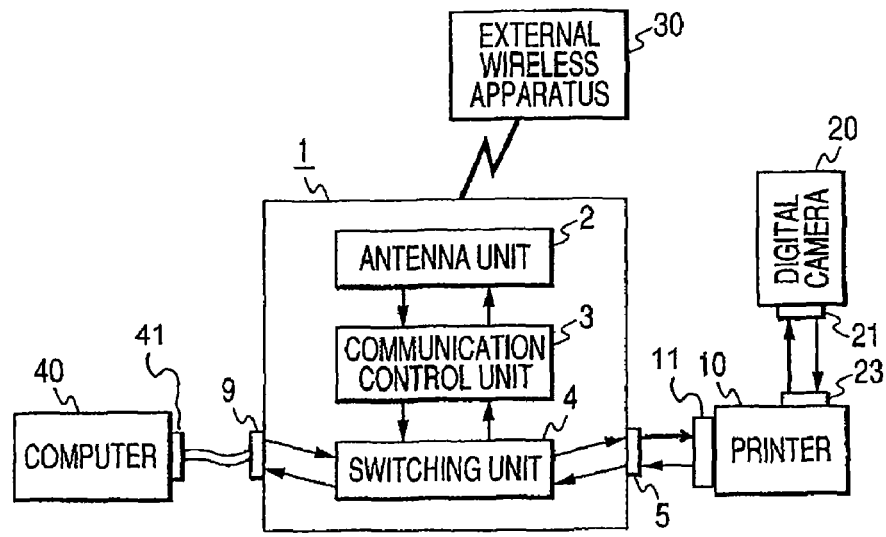
FIG. 4 is a block diagram showing an environment where a wireless communicating apparatus according to the invention is used (second embodiment)
Figure 5:
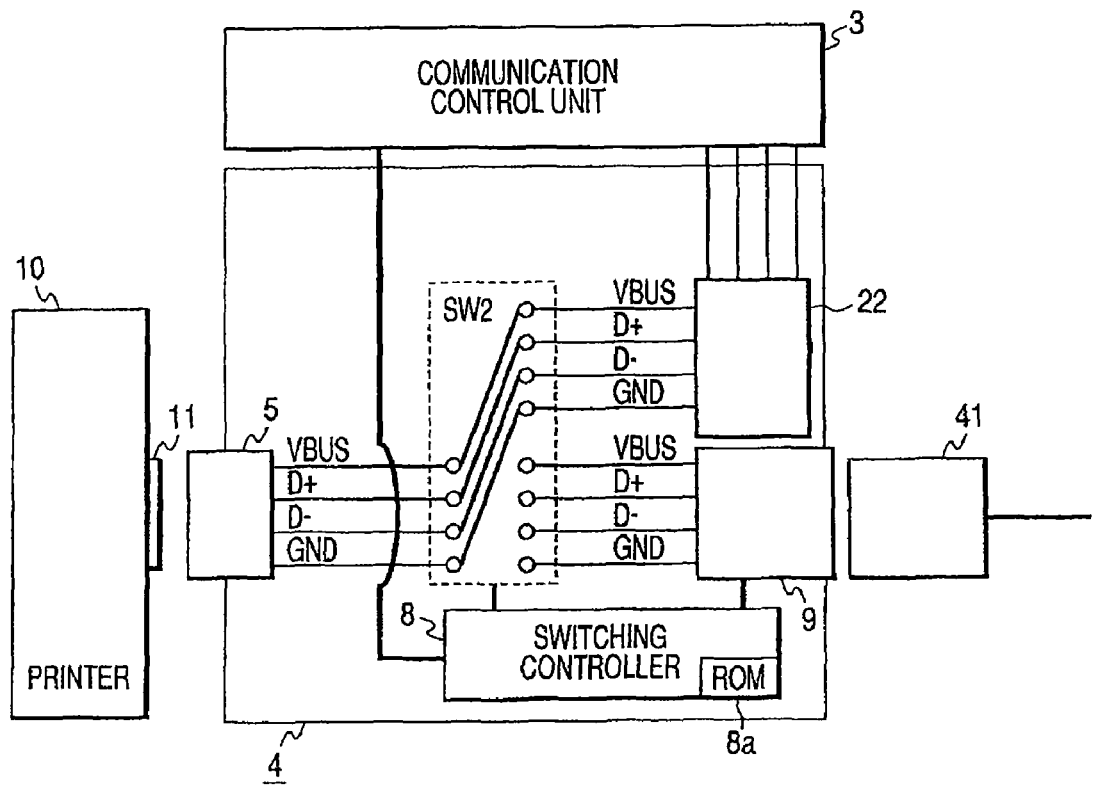
FIG. 5 is a block diagram showing a construction of a switching unit in the wireless communicating apparatus of FIG. 4.

FIG. 4 shows a construction including: the wireless communicating apparatus 1 in the embodiment; the printer 10 to which the wireless communicating apparatus 1 is connected; the digital camera 20 which is connected to the printer 10; the external wireless apparatus 30 which is connected to the printer 10 through the wireless communicating apparatus 1 by the wireless communication; and the computer 40 which sends print information to the printer 10. FIG. 5 shows an internal construction of the wireless communicating apparatus 1 in FIG. 4.

Although the wireless communicating apparatus 1 in FIGS. 4 and 5 has substantially the same construction as that of the wireless communicating apparatus 1 in FIGS. 1 and 2, in FIG. 5, a universal serial bus (USB) interface (USB I/F) 9 to which a universal serial bus (USB) connector 41 from the computer 40 can be connected is provided in place of the universal serial bus (USB) I/F 6 in which the connection of the digital camera 20 in FIG. 2 is presumed. Since other component elements of the wireless communicating apparatus 1 are similar to those in the first embodiment, their detailed explanation is omitted here.

In the second embodiment, in order to make control as will be explained hereinafter, it is sufficient that the universal serial bus (USB) I/F 9 is constructed so that the switching controller 8 can detect the state of the universal serial bus (USB) communication (with the PC) on the universal serial bus (USB) I/F 9. However, the universal serial bus (USB) I/F 9 may be also constructed in a hardware manner similar to that of the universal serial bus (USB) I/F 6. That is, the switch SW1 to detect the connection of the device may be provided. Thus, the wireless communicating apparatus 1 can be also constructed so that the operation in the first embodiment can be also executed.

Besides the universal serial bus (USB) I/F 11 adapted to connect to the universal serial bus (USB) I/F 5 of the wireless communicating apparatus 1, the printer 10 in the embodiment has a universal serial bus (USB) interface (USB I/F) 23 adapted to connect the universal serial bus (USB) connector 21 of the digital camera 20.

Even in the case where the two universal serial bus (USB) ports are provided for the printer 10 as mentioned above, according to the embodiment, since the power source of the wireless communicating apparatus 1 can be supplied from the computer 40 through the universal serial bus (USB) I/F 9, the printer 10 does not need to supply the power source to the wireless communicating apparatus 1. It is sufficient that the power source can be supplied only to the universal serial bus (USB) I/F 23 of the digital camera 20 side. Therefore, it is sufficient that the power source unit of the printer 10 has the power supplying ability for one universal serial bus (USB) port in a manner similar to the case of the first embodiment.

The switching controller 8 monitors the state of the communication with the computer 40 which is made on the universal serial bus (USB) I/F 9, monitors the wireless communicating state of the communication control unit 3, and controls the switching operation of the switch SW2 in accordance with the control procedure stored in the read-only memory (ROM) 8*a*. The switching controller 8 can be constructed by the control circuit such as a microprocessor or the like.

FIGS. 6A and 6B show a flow of the switching control program stored in the read-only memory (ROM) 8*a* of the switching controller 8 in the embodiment. The operation in the above construction will now be described hereinbelow with reference to FIGS. 6A and 6B.

FIG. 6A shows the control of the switching controller 8 when the universal serial bus (USB) signal from the computer 40 has been received on the universal serial bus (USB) I/F 9. FIG. 6B shows the control of the switching controller 8 when the communication with the computer 40 on the universal serial bus (USB) I/F 9 has been completed. First, the control when the universal serial bus (USB) signal from the computer 40 has been received on the universal serial bus (USB) I/F 9 will be described and, subsequently, the control when the communication with the computer 40 on the universal serial bus (USB) I/F 9 has been completed will be described.

In FIGS. 6A and 6B, when the printer 10 is not communicating with the computer 40, the printer 10 can make the wireless communication with the external wireless apparatus 30 through the communication control unit 3 of the wireless communicating apparatus 1. The data transmission and reception in the wireless communication are performed in a manner similar to those in the first embodiment.

The switching controller 8 monitors a universal serial bus (USB) communicating request from the computer through the universal serial bus (USB) I/F 9 and, at the same time, monitors the state of the communication control unit 3 (step S52). That is, when it is detected that the communicating request has been issued from the computer (step S51*a*), if the wireless communication is not made, the switching controller 8 switches the switch SW2 to the universal serial bus (USB) I/F 9 side (step S57*a*). By this switching operation, the printer 10 and the computer 40 are USB-connected and the enumeration is executed.

If the wireless communication is made, the switching controller 8 inquires of the user about whether or not the current print job is suspended (steps S53 to S54) by a method similar to that in the first embodiment. In the case of suspending the current print job, the switching controller 8 immediately switches the switch SW2 to the universal serial bus (USB) I/F 9 side (step S57*a*). If the user waits until the printing is completed, the completion of the printing is confirmed (step S55) and, thereafter, the switch SW2 is switched to the universal serial bus (USB) I/F 9 side (step S57*a*).

When the communication with the computer 40 on the universal serial bus (USB) I/F 9 is completed (step S61*a*), the switch SW2 is immediately switched to the universal serial bus (USB) I/F 22 of the communication control unit 3 side (step S62). By this switching operation, the communication control unit 3 and the printer 10 are USB-connected and the enumeration is started (step S63).

As mentioned above, according to the embodiment, by arranging the wireless communicating apparatus 1 between the printer 10 and the personal computer (PC) 40, both of the communication between the personal computer (PC) and the printer and the wireless communication of the printer can be relayed. According to the embodiment, the universal serial bus (USB) interface to connect the digital camera 20 is not occupied and the printing operation by the digital camera 20 (or another universal serial bus (USB) apparatus) can be executed any time.

The switching control of the switching unit 4 (switching controller 8) is made while monitoring the communicating state with the computer 40. When the communicating request has been issued from the computer 40, the universal serial bus (USB) I/F is switched from the communication control unit 3 to the computer 40 side. If the communication control unit 3 side is communicating, the switching controller 8 inquires of the user about whether or not the communication which is being executed is stopped. Therefore, such a problem that the important printing is stopped against the intention of the user does not occur.

Since it is sufficient to supply the current from the computer side to the wireless communicating apparatus 1, it is sufficient that the printer 10 has the universal serial bus (USB) current supplying ability for one a universal serial bus (USB) port in a manner similar to the case of the first embodiment. Therefore, it is sufficient that the power source unit of the printer 10 has sufficient ability to supply the current to almost one universal serial bus (USB) device from the universal serial bus (USB) I/F 11. No influence is exerted on the designing conditions of the printer 10.

Although the embodiment has been described with respect to an example in which the computer 40 is used as an external universal serial bus (USB) apparatus, naturally, the construction and operation similar to those mentioned above can be obtained even in the case of using another external universal serial bus (USB) apparatus in place of the computer 40.

As mentioned above, the hardware of the wireless communicating apparatus 1 in the second embodiment can be also constructed in a manner similar to that in the wireless communicating apparatus 1 in the first embodiment without a contradiction. That is, the hardware can be constructed so that the operation of any one of the first and second embodiments can be executed. With respect to a point that the wireless communicating apparatus 1 selects which one of the operations of the first and second embodiments (whether the detection of a digital camera or universal serial bus (USB) device (host) such as a personal computer (PC) which has newly been connected is made by using the detection of the connection of the connector as a trigger or is made by using the detection of the communicating state on the universal serial bus (USB) port as a trigger), such a selection can be made by switching a dip switch or can be set by communication which is made by using the personal computer (PC) or the like through the USB, whereby an operation with high flexibility can be realized.

In each of the foregoing embodiments, the universal serial bus (USB) I/F 22 is used for the connection of the communication control unit 3. When the universal serial bus (USB) I/F 22 on the communication control unit 3 side is dismounted by the operation of the switch SW2, the current supply to the communication control unit 3 is automatically stopped and, naturally, the wireless communicating function of the communication control unit 3 is stopped, so that electric power can be saved. However, if there is a special reason, such as the necessity of the supply of standby power to the communication control unit 3, or the like, it is also possible to control the device so as to reduce the amount of electric power which is supplied to the communication control unit 3 instead of stopping the power supply. For example, in the case of connecting the printer to the digital camera (in the case of the first embodiment) or the computer (in the case of the second embodiment), it is also possible to control the device in such a manner that after the wireless communicating function of the communication control unit 3 was stopped or the apparatus is shifted to the standby mode, the electric power which is supplied through the power source line of the universal serial bus (USB) I/F 22 is restricted, thereby reducing the electric power to be supplied to the communication control unit 3.

The invention can be embodied in the wireless communicating apparatus which is connected to the printer by using the universal serial bus (USB) interface and provides the wireless communicating function to the printer.

This application claims priority from Japanese Patent Application No. 2005-168955 filed on Jun. 9, 2005, which is hereby incorporated by reference herein.

What is claimed is:

1. A wireless communicating apparatus system comprising:
   a printer;
   a first universal serial bus interface connected to the printer;
   a communication control unit through which wireless communication is performed between the printer and another wireless apparatus for carrying out a print job by the printer;
   a second universal serial bus interface connected to a universal serial bus apparatus; and
   a switch controller monitoring a state of said communication control unit and a state of said second universal serial bus interface, respectively, and connecting either said communication control unit or said second universal serial bus interface to said first universal serial bus interface in accordance with the state of said second universal serial bus interface and the state of said communication control unit,
   wherein in response to connecting the universal serial bus apparatus with said second universal serial bus interface during the carrying out of the print job, said switch controller sends the printer a notification that the universal serial bus apparatus has been connected with said second universal serial bus interface, wherein the printer determines a determination result regarding whether or not to wait until the print job is finished in response to the notification from said switch controller and transmits the determination result to said switch controller, wherein said switch controller receives the determination result from the printer, and wherein said switch controller connects said second universal serial bus interface to said first universal serial bus interface after the wireless communication for the print job by the printer is finished in response to the determination result indicating to wait until the print job is finished and connects said second universal serial bus interface to said first universal serial bus interface without waiting until the wireless communication for the print job is finished in response to the determination result indicating not to wait until the print job is finished.

2. A system according to claim 1, wherein when the universal serial bus apparatus is connected to said second universal serial bus interface, said switch controller switches a connection destination of said first universal serial bus interface from said communication control unit to said second universal serial bus interface.

3. A system according to claim 2, wherein when said switch controller discriminates the printer is not making wireless communication through the communication control unit, said switch controller switches a connection destination of said first universal serial bus interface from said communication control unit to said second universal serial bus interface.

4. A system according to claim 1, wherein when a communicating request of the universal serial bus apparatus connected to said second universal serial bus interface is issued, said switch controller switches a connection destination of said first universal serial bus interface from said communication control unit to said second universal serial bus.

5. A system according to claim 1, wherein when performing switching by said switch controller so as to connect said second universal serial bus interface to said first universal serial bus interface in place of said communication control unit, said communication control unit sets a wireless communicating function into a suspension mode or a standby mode.

6. A system according to claim 1, wherein the universal serial bus apparatus is a digital camera or a computer.

7. A control method of a wireless communicating system having a printer, a first universal serial bus interface adapted to connect to the printer, a communication control unit through which wireless communication is performed between the printer and another wireless apparatus, and a second universal serial bus interface adapted to connect to a universal serial bus apparatus, said method comprising:

monitoring, by a switch controller, a state of the communication control unit and a state of the second universal serial bus interface, respectively, and connecting either the communication control unit or the second universal serial bus interface to the first universal serial bus interface in accordance with the state of the second universal serial bus interface and the state of the communication control unit;

sending a notification to the printer, by the switch controller, in response to connecting the universal serial bus apparatus with the second universal serial bus interface while the printer is performing a print job through the communication control unit's wireless communication;

determining, by the printer, a determination result regarding whether or not to wait until the print job is finished in response to the notification;

receiving the determination result from the printer by the switch controller;

connecting, by the switch controller, the second universal serial bus interface to the first universal serial bus interface after the wireless communication for the print job by the printer is finished in response to the determination result indicating to wait until the print job is finished; and connecting, by the switch controller, the second universal serial bus interface to the first universal serial bus interface without waiting until the wireless communication for the print job is finished in response to the determination result indicating not to wait until the print job is finished.

* * * * *